United States Patent [19]

Schneider

[11] 4,238,241

[45] Dec. 9, 1980

[54] ACIDIC ASPHALTIC COMPOSITION AND METHOD

[76] Inventor: Gordon L. Schneider, 4236 Cottage Cir. #3, Las Vegas, Nev. 89109

[21] Appl. No.: 923,799

[22] Filed: Jul. 12, 1978

Related U.S. Application Data

[63] Continuation-in-part of Ser. No. 878,232, Feb. 16, 1978, abandoned, which is a continuation of Ser. No. 656,957, Feb. 10, 1976, abandoned, which is a continuation-in-part of Ser. No. 489,472, Jul. 18, 1974, abandoned.

[51] Int. Cl.³ .................. C08L 95/00; C09C 3/00; E01C 7/24; E01C 7/26
[52] U.S. Cl. ...................... 106/281 R; 106/288 B; 404/75
[58] Field of Search ............... 106/275, 277, 281 R, 106/288 B; 404/75

[56] References Cited

U.S. PATENT DOCUMENTS

| | | | |
|---|---|---|---|
| 127,992 | 6/1872 | Snow et al. | 106/275 |
| 2,469,728 | 5/1949 | Holmes | 106/281 R |
| 2,603,573 | 7/1952 | Blott et al. | 106/281 R |
| 2,669,525 | 2/1954 | Bransky et al. | 106/278 |
| 2,675,328 | 4/1954 | Wishlinski et al. | 106/273 R |
| 2,705,681 | 4/1955 | Wishlinski et al. | 106/277 |
| 3,470,006 | 9/1969 | Brunel | 106/123 |
| 4,124,325 | 11/1978 | Cutler | 404/75 |

*Primary Examiner*—Allan Lieberman
*Attorney, Agent, or Firm*—Seiler & Quirk

[57] ABSTRACT

The addition of aqueous dilutions of a sulfonic acid source of 0.2% to 0.8% acid concentration to an aggregate or to a composition of asphalt and aggregate in hot asphalt plants enables a decrease in the amount of asphalt required in comparison to compositions not so treated while achieving comparable strengths and durability when the composition is laid down as road paving material. The improved distribution of asphalt reduces usage by 10% to 40% and permits the incorporation of additional finely divided material to achieve higher strengths, or, inversely, to permit a higher percentage of voids to exist in the completed materials so as to provide for a porous paving material with suitable strength. The use of water in quantities of from 1,000 gallons to 3,000 gallons per 100 tons of aggregate and a sulfonic acid source in quantities of from 0.5 to 8 gallons per 100 tons of aggregate to provide an aggregate-acid-water composition having an initial pH of less than 3.5 makes possible a more economical operation of a hot mix plant, a better control over the quality of the end product, a reduction of the dust nuisance usually associated with such operations and a substantial extension of the use of available asphalt supplies. The use of sulfonic acid sources eliminates the need for adding various fluxing and reclamation agents, petroleum hydrocarbons, oils and asphalt as is standard practice in processes wherein existing asphaltic surfacing is being recycled or reused in hot mix plants, by heater planers and other standard roadbuilding and maintenance equipment as well as in the Mendenhall, Cutler and McConnaughay processes. By utilizing standard roadbuilding and maintenance equipment and supplemental sources of heat, any existing asphaltic surfacing, regardless of thickness or the extent of oxidation or deterioration, may be recycled in situ and reused entirely as new surfacing or, at the discretion of the engineer, used in part as valuable stabilizing material in the base. Paving asphalts may be applied to rock, gravel, sand and soils present in the road bed in conjunction with heat, hot water or steam and a sulfonic acid source so as to achieve compositions satisfactory for use as either paving materials or asphalt stabilized base.

30 Claims, No Drawings

ACIDIC ASPHALTIC COMPOSITION AND METHOD

CROSS REFERENCE TO RELATED APPLICATIONS

This application is a continuation-in-part of my copending application Ser. No. 878,232 filed Feb. 16, 1978, now abandoned which is a continuation of Ser. No. 656,957 filed Feb. 10, 1976, now abandoned, which is a continuation-in-part of Ser. No. 489,472 filed July 18, 1974, now abandoned.

BACKGROUND OF THE INVENTION

This invention relates to the preparation of hot asphalt or asphaltic concrete compositions and more particularly to the treatment of aggregate or aggregate plus asphalt with (1) water and (2) a sulfonic acid source selected from the group consisting of sulfuric spent acid and sulfuric acid sludge to provide an acidic asphaltic road paving composition having a pH less than 3.5 and preferably a pH less than 2. The treatment of the aggregate or the treatment of the aggregate plus asphalt with the sulfuric acid source and at least 1000 gallons of water per 100 tons of aggregate enables a reduction in the amount of asphalt from 10% to 40% while maintaining the required strength as measured by Marshall Stability and other tests.

The trend in the road building industry has gone from the use of liquid asphalts to using harder paving asphalts or asphaltic concretes which must be applied to an aggregate in a hot condition. This trend has been accelerated with the recent critical shortages of various fuels used as solvents to cut back the asphalts, such as gasoline, kerosene, diesel oil and fuel oil fractions. Another recent problem in the road building industry is the shortage and high cost of paving asphalts. The present invention enables the road building to reduce the amount of asphalt by 10% to 40% while maintaining the required strength and wear resistance of prior art asphaltic compositions.

Common asphaltic compositions used for paving roads and used for the base material upon which the paving material is over-laid basically comprise a mixture of aggregate and asphalt. Typical aggregate formulations and asphalt properties are set forth in *Standard Specifications, State of California Dept. of Public Works, Division of Highways*, Jan. 1960, and in *ASTM Standards on Bituminous Material for Highway Construction, Waterproofing, and Roofing*, Ninth Edition, Oct. 1962. Enough asphalt is inclined so that complete coating of the aggregate particles is assured. The asphalt must coat the particles and cement the adjacent or adjoining particles together to achieve the required amount of strength necessary for a road construction material. The mixing of the aggregate and asphalt is generally done when the materials are hot to assure the proper coating and to make the mixture fluid enough to assure bonding after the composition is laid and rolled into a road surface on location.

When applying paving asphalts or asphaltic concrete, it is standard practice to heat both the asphalt and the aggregate to which it is to be applied. The asphalt is heated in order to increase its fluidity and flow characteristics so that it will thoroughly coat the aggregate and bond the adjacent particles together when it cools and hardens. The purpose for heating the aggregate is twofold. First, it is done so that the asphalt will not be chilled too rapidly when it comes in contact with the rock or gravel particles. This would prevent proper coating and cementing. Of equal or greater importance is the fact that any perceptible amount of moisture present upon the face of the aggregate will prevent coating to even a greater degree than the cooling or chilling effect of an unheated surface on the rock or stone. In order to maintain fluidity of the asphalt it has been maintained at a temperature of from 250° to 300° at the point of application. In order to thoroughly heat and dry the aggregate it has been subjected to a heating cycle at temperatures of from 275° to 325° for a period of time long enough to thoroughly dry the surface of the material. Since the amount of moisture present in aggregate stored outdoors will range from a low of 4% to as high as 12% by weight, the amount of heat required for the removal of the water stored in the aggregate mass is very high. If it is not removed, the finished product has been of poor quality.

In fact, this animosity towards water is displayed by all prior art asphalt compositions since water cannot be retained or "dissolved" therein. Although liquid asphalts, often referred to as "cutbacks," are sometimes applied at slightly elevated temperatures (100° to 180° F.), the aggregate to which they are applied is not heated. It is sometimes applied through a pugmill at or near a gravel pit or storage pile. However, it is most frequently added to the rock or gravel on the roadway itself along a windrow near the job site. If the aggregate is too wet at the time of the application, the asphalt may fail to "set up." When this happens it is usually necessary to rip or scarify the road and aerate it by blading or pulvamixing. Then it is laid down and compacted again. Sometimes when the work has been properly done a hard rainstorm occurring soon after the completion of the project will displace the asphalt to a lower depth in the base of the road or at times even wash it out into the ditches.

Emulsions which combine the asphalt, water, and detergents or wetting agents into a dispersion appear to solve some of the problems mentioned above. However, since high temperatures, a high volume of emulsifying agent (approximately 1% by weight), and a high energy input provided by powerful pumps and colloid mills is necessary for the production of these emulsions, they are quite expensive. In addition, they may not be used in materials that are excessively wet at the time of application and will frequently wash out after proper application during heavy precipitation. While these prior art asphalt compositions are classified as anionic, cationic or nonionic, they operate within a very narrow range centered upon a pH of 7 and their basic function is that of saponification.

There are other prior art compositions formulated for the purpose of generally improving the coating characteristics of asphalt and particularly directed toward overcoming the normally unsatisfactory wetting or coating action of unmodified asphalts in wet aggregates. Typical of such preparations are Dohse U.S. Pat. No. 2,191,295, Blott U.S. Pat. No. 2,603,573, Bransky U.S. Pat. No. 2,669,525, Wishlinski U.S. Pat. Nos. 2,675,328 and 2,705,681 and Brunel U.S. Pat. No. 3,470,006. All of these compositions utilize a wide variety of mineral and organic acids, filler materials, solvent mixtures, petroleum oils, phenols and neutralizing agents in order to produce waterproofing sealants, impregnating and anti-stripping agents which are blended with asphalt of heavy oils before incorporation into aggregate. All of them possess a pH at or above neutrality. Except for Blott, none of them claims that the application of the compound to the aggregate prior to the introduction of the asphalt to be of benefit. While Blott permits the incorporation of various acids and phenol binders into the aggregate before neutralization, it is required that enough lime be present in the aggregate to bring the pH into the neutral zone.

These various preparations utilize an enormous variety of acidic materials. Mineral, naphthenic, carboxylic, hydroxy, lauric, myristic, palmitic, stearic, carnubic, oleic, linoleic, linolenic and various acid sludges are specified. To them are added various oils such as polymers, tall oil, unsaturated petroleum oils, alkyl aryl hydrocarbon oils, phenols and, at times, short and long chain alchols. Fillers such as chalk, asbestos and spent clay are usually incorporated. In every example, various carbonates or, preferably, hydrated or deydrated lime is used in order to neutralize the compound, thus creating a specialized saponified product, or at least, one that contains water-insoluble acid soaps or metal sulfonates.

It has long been known that the incorporation of lime directly into any asphalt is highly detrimental since it causes embrittlement and excessive oxidation, thus shortening its life. It has also been recognized that adding lime or any other hydroxide to the aggregate prior to blending in the asphalt, while not as deleterious as its incorporation into the asphalt, is still detrimental, or, at best, of little or no value. On the other hand, it has also long been known that the incorporation of acids, even in dilute solutions causes a premature disintegration of the resulting asphaltic composition. It is for these reasons that, until now, it has been considered necessary that all compounds utilized in conjunction with asphalt must be at or near neutrality.

The art as taught by Holmes in U.S. Pat. No. 2,469,728 appears to contradict the premise outlined above. However, it is to be noted that the aggregates specified are limited to calcareous materials such as oyster and clam shells which are notoriously difficult to coat with asphalt, both because of their high moisture-retention characteristics and high pH. Since a wide variety of mineral and organic acids are specified, it is obvious that neutralization of the surface of the aggregate was the primary object of the treatment since an asphalt containing an amine wetting agent is specified in conjunction with the process. This is further borne out by that fact that the strength of the dilutions recommended are from 2% to 10%, approximately 10 times the rate I specify. It is also obvious that the unique properties possessed by the sulfonic acids were not recognized since they are not mentioned.

By virtue of their neutrality none of the preparations described by Dohse, Blott, Bransky or Wishlinski are capable of reacting or interacting with the surface of the aggregate, whether they are blended into the asphalt prior to application to the aggregate or introduced into the aggregate before the asphalt is applied. In these patents and in scores of others that I have examined, it is obvious that the unusual catalytic and surfacant properties inherent in the sulfonic acids, especially those that are entirely or predominately water-soluble have not been known to the art. In some cases the wide variety of acids specified or suggested confirms this fact, the Blott patent being a case in point. When a potential sulfonic acid source is specified, as in the Bransky patent, the two Wishlinski patents and that of Brunel, it is the heavy, viscous, low acid and, correspondingly, sludges sometimes referred to as "liver" that are relatively insoluble in water that are required. Their insolubility is further enhanced by the incorporation of additional aromatic hydrocarbons, aliphatic petroleum oils, phenols and catalytic cycle stocks. In every case it is the announced purpose of the invention to produce a "soap mixture" (Bransky, column 3, line 33, No. 2,669,525; Wishlinski "water-insoluble sludge acid soaps," column 1, line 25, No. 2,675,328; Wishlinski, "water insoluble soaps of sulfonic acids," column 1, line 33, No. 2,705,681, and Brunel, "to produce corresponding soaps which act as agglutinizing agents," column 1, line 70, No. 3,470,006). Even if those sources of sulfonic acid preferred in my invention, i.e., spent acids and sludges that are nonviscous and with acidities of from 60% to 92% and preferably from 82% to 87%, were substituted for the heavy sludges specified by these and many other patents, the inclusion of the oils, phenols, etc. and the neutralization of the composition to a narrow range centered upon pH 7 would completely destroy their usefulness for my purposes.

All of these prior art compositions of Holmes, Bransky, Blott, Dohse, Wishlinski and others were formulated for the purpose of obtaining the better adhesion of liquid asphalts, usually known as "cutbacks," to wet aggregates. They are of no value in the asphaltic materials used in hot mix plants because of the necessity for completely drying the aggregate before adding the asphalt and because the practice of applying relatively pure asphalt heated to high temperatures and applied to the surface of hot, dry aggregate had eliminated the need for such additives. Neither have any of the emulsions been found either beneficial or compatible with hot plant practice.

In accordance with the present invention, the copious use of water combined with the maintenance of an acid pH, preferably below 2.0, obtained exclusively by the use of dilute sulfonic acid-water solutions, differentiates the compositions of the present invention from the prior art compositions containing emulsifying agents, or anti-stripping agents that have long been used by the petroleum industry.

It is apparent that the accelerated reduction-oxidation reactions that occur immediately following the application of the acid-water solution are concentrated primarily at each site where some metal is present upon the face of the aggregate or soil particle in the silicon-oxygen structure that comprises approximately 75% of the bulk and volume of most rocks and soil materials. The metals most commonly found at sites of substitution for silicon in the structure of soils and rock are: aluminum 8.1%, iron 5.1%, calcium 3.6%, sodium 2.8%, potassium 2.6% and magnesium 2.1%. Many other micro elements are also found, but they are unimportant to the content of this patent. It appears obvious that the conversion of these various metals situated in the soil structure and exposed upon the surface, to metal sulfonates (aluminum sulfonate, iron sulfonate, calcium sulfonate, calcium sulfonate, etc) is, in a large measure, responsible for the increased compatability of asphalt with rock and soil particles and its tighter adhesion to them in contrast to the results achieved when they are converted to sulfates, nitrates or phosphates by the application of sulfuric, nitric or phosphoric acid, or, for that matter with any known organic acid.

The conclusion that the conversion of dilute sulfonic acid into the sulfonates of the various metals that are to be found exposed upon the surface of rock and soil particles and that the resultant coating possesses unique bonding qualities is supported by the fact that the reduction of the amount of asphalt required for satisfactory coating and cementation is still achieved even when it is applied after the aggregate has been thoroughly dried. That the sulfonate coating is thoroughly bonded is evidenced by the fact that the aggregate can be tumbled in a cylinder for long periods of time without deleterious effects upon the improved coating characteristics of the asphalt when applied subsequently. Neither is there any evidence of deterioration in the sulfonate coating upon long storage before reheating and applying the asphalt at a later date. Whether the bonds are semi-ionic or covalent, it is readily apparent that the conversion to sulfonates of the exposed sites where metals are present upon the face of the aggregate is vastly superior to attempting to first formulate such compounds and then to try to discover a way to cause them to become bonded to the aggregate afterwards. This is, in effect, what the other compounds such as emulsifying agents and anti stripping agents sought to achieve.

In addition to the presence of sulfonate deposits upon the surface of the aggregate as an aid to the coating of asphalt, properly selected sulfonic acid sources serve another important function. When a composition consisting of a dilute solution of sulfonic acid and water, aggregate and asphalt are agitated and heated, the asphalt is temporarily converted into an emulsion or a dispersion, thus greatly improving its fluidity and dispersibility and assuring better coatability and bonding of the aggregate. It is apparent that the emulsions or dispersions formed are of the so-called inverted type wherein the asphalt is the continuous phase and the solution is the discontinuous phase. This accounts for the unique properties displayed by such a composition that contains far more moisture than can usually be tolerated by hot asphaltic concrete, provided that the pH is maintained at a point below 3.5 and preferably below 2.0. Like any other emulsion, such a composition will dry out, or, to use the terminology usually applied to the phenomenon, it will "break", and the resulting paving will have all the properties of any other asphaltic concrete even though from 10% to 40% less asphalt is present.

It is possible to produce cationic inverted emulsions by introducing heated asphalt and sulfonic acid solution into a high speed blender or homogenizer such as the Barrington Mixer. However, such emulsions do not achieve the same results as the materials described in this specification because of the absence of the oxidation-reduction processes previously described and the absence of the sulfonate coating upon the aggregate. It is this unique dual chemical phenomenon that marks the novelty of the processes described in this patent. As a result, the hot plant operator may apply the asphalt after the aggregate is treated and dried, he can introduce asphalt and solution simultaneously or the solution and then the asphalt prior to or concurrent with heating or he can, if necessary, introduce the solution subsequent to heating and applying the asphalt. While, in theory, the best results are to be expected when the solution and then the asphalt are applied prior to heating, excellent results have been achieved using the other sequences described.

It has previously been thought necessary that such a hot mixture of aggregate and asphalt must be kept dry and heated to approximately 300° F. to assure proper bonding on location. It has been found that by adding a dilute solution of sulfonic acid and water to aggregate or aggregate plus asphalt, the asphalt percentage can be reduced by 10% to 40% while maintaining the required bonding and strength.

The acid-water solution reacts with the aggregate to make it more receptive to asphalt coating so long as the aggregate-acid-water composition is at a pH less than 3.5 and preferably less than 2.0 so that the amount of water-acid solution brings the moisture content within a range of 4% to 12%, depending upon the gradation and absorption characteristics of the aggregate used.

It is an object of the present invention to provide an asphaltic composition having a reduced amount of asphalt while maintaining the required strength when laid and rolled into a road surface.

Another object of the present invention is to provide an asphaltic composition useful as a paving material and as a base material.

Another object of the present invention is to provide an asphaltic composition capable of providing porous paving material.

Another object of the present invention is to provide an asphaltic composition better adapted for producing hot paving emulsions prepared in a hot mix plant.

Another object of the present invention is in providing an asphaltic composition employing a sulfonic acid source.

Another object of the present invention is to provide an asphaltic composition containing enough water to assure proper fluidity and coatability of aggregate.

Another object of the present invention is to provide an asphaltic composition capable of being heated and laid down at location at a lower temperature.

Another object of the present invention is to provide a method of making an asphaltic composition employing the composition of the present invention in a hot mix plant.

Another object of the present invention is to provide an asphaltic composition capable of retaining heat for a longer period of time.

Another object of the present invention is to eliminate the need for incorporating additional petroleum-based softening agents, oils, hydrocarbons and asphalt when recycling asphalt reclaimed from existing streets and roadways in standard hot plants or specialized equipment such as the Mendenhall machines decribed in U.S. Pat. Nos. 3,845,941 and 4,000,000.

Another object of the present invention is to eliminate the need for the addition of petroleum-based softening agents, oils, hydrocarbons, asphalt and specialized rejuvenating agents such as Reclamite, produced by Witco Chemical Corporation's Golden Bear Division, when resurfacing or refinishing worn and oxidized asphalt wearing surfaces with heater planers, other standard road building and maintenance equipment and specialized equipment such as the Cutler machine.

Another object of this invention is to provide a means whereby standard roadbuilding and maintenance equipment supplemented by various means for supplying heat may be able to recycle all of the existing asphaltic surfacing in situ and thus dispense with the need for hauling it to a hot plant facility.

Another object of the present invention is to provide a means whereby standard equipment and supplemental sources of heat may be able to reuse all of the recycled asphalt as surfacing or, at the discretion of the engineer, apportion part of it for use as base material.

DEFINITIONS

"Asphalt"—bituminous and petroleum tars, oils and pitches utilized in binding aggregate particles in the formation of stabilized soil and road paving. Under this definition are included those liquid asphalts usually referred to as "cutbacks" and designated as MC (medium cure), RC (rapid cure) and SC (slow cure). Also included are the relatively pure asphalts usually referred to as AC 5, AC 10 and AC 20, which must be heated to temperatures above 225° F. in order to achieve enough liquidity to be blended with the aggregate.

"Sulfonic Acid Sources" as herein described refer exclusively to those sulfuric acid derivatives or by-products that are known as "Sulfuric Acid Sludge", "Spent Sulfuric Acid Sludge" and "Spent Sulfuric Acid" as further defined hereafter.

"Sulfuric Acid Sludge"—waste or spent sulfuric acid usually resulting as a by-product from refining petroleum oils or benzene. The acid treatment of oils which form sulfuric acid sludges is usually performed to improve the color or quality of the oil. During such treatment, the acid gradually becomes ineffective as it becomes loaded with various hydrocarbon chain fragments that are seized because they are lacking a hydrogen atom that otherwise would protect the carbon beneath from acid attack. Their formation is described in U.S. Pat. No. 2,705,681. However, in the patent they are neutralized subsequent to formation in direct contrast to their utilization in the present invention. Although "sulfuric acid sludge" is chemically complex and virtually impossible to define chemically, it is well known in the art. For example, Kalichevsky and Kobe in *Petroleum Refining with Chemicals* state:

"The composition of sulfuric acid sludges is very complex. Sludges contain many reaction products not found in crude oils and undergo considerable changes in chemical composition on standing. This is demonstrated by changes in the physical appearance of the sludge and by the evolution of sulfur dioxide."

"The sulfuric acid sludges contain sulfuric acid esters, sulfonic acids, salts of nitrogen bases, resinous and asphaltic materials, sulfur compounds dissolved from the oil, hydrocarbon polymers, condensation products and entrained oil. The composition varies with the nature of the crude oil fraction, treating conditions and time of storage. Sludge is an emulsion formed by two dispersed phases included in an organic dispersion medium." Acid sludges resulting from the processing of tall oil, naptha, asphalt and lube oil with acidity from 25% to 60%, while usable for purposes of this invention, give less satisfactory results than spent acids and sludges with acidity in excess of 60%.

"Spent Sulfuric Acid Sludge and Spent Sulfuric Acid"—"sulfuric acid sludge" resulting from petroleum refinery processes, such as alkylation sulfonation and isomerization. Such processes utilize highly concentrated sulfuric acid. The alkylation process uses a sulfuric acid of 98 percent concentration, the acid serving as a catalyst in the process. Although the concentrated acid functions as a catalyst during the alkylation process, the acid ultimately becomes diluted by entrained or absorbed hydrocarbons and water so that the concentration falls below a minimum effective level of 88 to 92 percent. In such a diluted state it is a brown or mahogany colored fluid liquid that will, upon standing for a period of time, gradually turn purplish or black in color. It is generally designated in the petroleum industry as spent acid sludge or a mahogany sulfonate. Such a spent acid sludge typically has an acidity of approximately 85 to 92 percent and contains about 4 to 10 percent hydrocarbons and about 0.1–0.3 ash.

Detailed Description of the Invention

The addition of the sulfonic acid source and water can be adapted to any hot asphalt process and is particularly adapted to the following four types of hot asphalt plants: (1) asphalt batch mix plants; (2) asphalt continuous mix plants; (3) the Boeing drum mix asphalt plant; and (4) the Barber-Greene drum drier plant.

In the batch mix plant, a cold aggregate storage and feed unit stores the aggregate and accurately feeds the required amount of each size particle to a belt feeder to maintain the desired balance of particles. The aggregate is fed to a drier where it receives maximum drying by direct contact with flame and hot gases. A gradation control unit separates and stores the dried aggregate and measures and feeds the required amount of each size particle to hot bins. Mineral fillers are generally added to the gradation control unit in a separate mechanical feed apparatus. The particles are separated into hot bins and stored for continuous feeding to a weigh-hopper. The weigh-hopper measures the size of the aggregate, including mineral filler, and the aggregate is added to a pugmill. An asphalt weigh-bucket measures the correct quantity of asphalt which is added to the pugmill with the aggregate. In the pugmill the aggregate and hot asphalt are thoroughly mixed. From the pugmill, the hot asphaltic composition is loaded for transportation to the location where it is to be laid and rolled. A dust collector is generally necessary for recovery of fines that may be returned to the mix if required.

In an asphalt continuous mix plant the same general procedure is followed as outlined for the batch mix plant with the exceptions that (1) individually adjusted gates accurately proportion the required percentage of each size particle of the aggregate instead of utilizing a batch-type weigh-hopper and (2) asphalt is continuously metered into the pugmill together with the proportioned aggregate. A typical mix comprises 43% by weight sand and 57% by weight gravel. The principal manufacturers of both batch plants and continuous mix plants are Standard, Barber-Greene and Cedar Rapids.

The Boeing drum mixer is a continuous hot mix plant similar to that described above except that asphalt is continuously metered into a drum dryer/mixer together with the aggregate, as opposed to the addition of asphalt at the pugmill. Inside the drum dryer/mixer the aggregate is mixed with the asphalt and dried all in one step. The finished mix exits the drum dryer/mixer eliminating the need for a pugmill.

The sulfonic acid source and water addition to the hot mix asphalt plants described above is also advantageous which operates on principles similar to that of the Boeing plant in the Barber-Greene drum dryer plant. However, this process is equally suitable for use in plants built by other manufacturers such as Hetherington and Berner, Wylie and Shearer.

The asphalt composition can be treated with the sulfonic acid and water, as described herein, at a number of plant locations. The cold aggregate can be treated with the sulfonic acid source and water, then heated and dried so that the moisture content is less than 1% and preferably less than 0.5%, followed by the addition of asphalt. Alternatively, the aggregate can first be heated, then treated with the sulfonic acid source and water and then the asphalt applied. Another method of treatment is by heating the aggregate and then treating the hot aggregate simultaneously with the sulfonic acid source, water and asphalt. A fourth method of treatment is by applying the asphalt and the water solution containing the sulfonic acid source simultaneously to the aggregate prior to heating. It is preferred to apply the sulfonic acid and water to the cold aggregate prior to heating followed by application of asphalt and then mixing or to simultaneously introduce the asphalt and acid-water solution to the cold aggregate prior to heating.

When the acid-water solution is applied to the aggregate and then heated, it has been found advisable to reduce the moisture content to below 1% and preferably to less then 0.5% prior to the application of the asphalt if optimum results are to be obtained. This is particularly true of aggregates high in calcium sources such as mussel shells, soft Florida limestones and caliches and can be attributed to the fact that the acidity of the entrained moisture has been neutralized to a point above 3.5 by the time the asphalt has been applied. Higher moisture contents are permissable in the more neutral aggregates, but it has been observed that initial test data such as Marshall Stability is much lower than when the aggregate has been dried to less than 1% moisture content. If a hot asphalt emulsion of exceptionally low asphalt content, such as 1.5% to 4% is desired, the application or reapplication of the acid-water solution at the pugmill either just prior to or concurrent with the application of the asphalt would make it possible to increase the moisture content to the 1% to 4% that would be required for such compositions. When producing such compositions, temperatures in the dryer may be reduced to 225° F. or less, but it must be reemphasized again that it is essential that the pH of the aggregate-water-acid composition be a pH of less than 3.5 and preferably below 2.0 when the asphalt is incorporated into compositions containing more than 1% moisture, and that it is equally vital that less than 1% moisture be present when asphalt is applied to aggregate having a pH above 3.5.

An important feature of the present invention is in the fluidity or liquidity obtained in the asphaltic composition of the present invention. Because a much lower percentage of asphalt is necessary in the asphaltic composition, and because of the addition of the sulfonic acid containing material and the interaction or reaction of the aggregate with the acid-water solution, the aggregate is more receptive to being completely coated with 10%–40% less asphalt.

Asphaltic construction compositions have three basic functions: (1) to bond the aggregate together; (2) to coat the particles of aggregate to reduce or eliminate skidding; and (3) to seal the spaces or voids so the surface is impermeable or almost impermeable to water. In prior art compositions, as much as 10% to 40% more asphalt is necessary to assure the proper coating of the aggregate particles. This additional asphalt necessarily seals the spaces or voids between particles making the laid and rolled asphalt impermeable to water. This third purpose of asphalt, to seal the spaces or voids, wastes asphalt which is presently in critically short supply. In addition, it contributes to skidding and consequent hazard of automobile accidents because of water retained upon the surface of the paving. However, in prior art compositions, the additional asphalt is necessary to assure proper coating of the aggregate particles.

The capability of using much less asphalt by the addition of the sulfonic acid source and water to an aggregate in accordance with the present invention, enables the hot plant operator to achieve much better control over his product. This is because the hot plant operator has a choice of materials which he can add in lieu of that asphalt which is found unnecessary in the practice of the present invention. For example, to replace the unnecessary asphalt, the hot plant operator can add additional fine particles and achieve higher strength or use smaller amounts of fine particles and obtain a more porous paving material. It is an important feature of the composition of the present invention that additional fine particles can be added for the purpose of achieving higher strength. Another important feature of the composition of the present invention is that a higher percentage of larger particles can also be used to achieve more porous paving materials. Additional water can be added to increase the fluidity or liquidity of the composition to achieve better aggregate coating and easier dispersibility of the composition. Better control can also be exercised over the final product in accordance with the present invention in that the temperature of the hot mix process can be adjusted to lower than previously necessary in prior art hot mix plants.

In prior art hot mix asphalt plants, the aggregate is generally heated to about 300°–350° F. and the asphalt to about 275° F. An important quality of the composition described herein is that drum temperatures of typical hot mix plants can be reduced by as much as 50°–70° F. Temperatures as low as about 210° F. have been found effective in some asphaltic compositions.

The asphalt can be more evenly dispersed in the paving or base composition resulting in a more complete coating of the aggregate particles although less asphalt is employed. Further, asphalt creates better bonds at the points of contact between aggregate particles because of the interaction or reaction between the acid-water solution and the aggregate causing the asphalt to become tenaciously bonded to the aggregate particles.

It is completely surprising that the asphaltic compositions of the present invention can achieve Marshall Stability readings (strength, as set forth in Table V) comparable to asphaltic compositions having 10%–40% more asphalt. It is truly amazing that the asphaltic composition of the present invention actually creates better bonds at the points of contact between aggregate particles with 10%–40% less asphalt. In fact, the bonding must be better since the composition generally does not completely fill the interstices between aggregate particles but must rely upon the strength of the bonds where the aggregate particles are in contact. These stronger bonds are attributable to the interaction or reaction between the acid-water solution and the aggregate particles, which only occurs when enough sulfonic acid source is used to provide a pH of the aggregate-acid-water composition less than 3.5. If asphalt is added to the aggregate together with the acid-water solution, the entire composition should have a pH less than 2.0.

The asphaltic concrete composition resulting from the addition of asphalt, simultaneously with or after treatment of the aggregate with the above-described acid-water solution, has the new and unexpected results of (1) providing equivalent strengths using 10–40% less asphalt, (2) creating better bonds between aggregate particles with a thinner composition and (3) being capable of providing a porous asphalt composition. Further, as outlined above, the strength as indicated by Marshall Stability and other tests can be greatly increased by the addition of finely divided particles. The improved dispersibility of the asphalt produces a paving composition having a more uniform strength on location when laid and rolled.

Since it is a standard practice of hot plant operators to add finely divided mineral fillers to asphalt-aggregate compositions in order to improve their gradation, it is only necessary that the amounts of such materials used be adjusted to the new and broader range of usage made possible by this invention.

The addition of finely divided particles to replace the asphalt reduces the percentage of voids by about 3%, down to that percentage achieved in prior art processes which utilize higher percentages of asphalt. Since finely divided materials are much less expensive than asphalt, the addition of fines is highly desirable. The fines added are generally one or more of the following: lime, $CaCO_3$, cement, sand, mineral fillers such as fly ash, and the like. These fines are more readily bonded and more easily fitted into spaces between larger aggregate particles because of the absence of 10-40% of the asphalt necessary in prior art asphaltic concrete compositions. Prior art asphaltic compositions are limited in the amount and type of fines usable in the asphaltic composition and cannot use more than about 3% fines passing a 200 mesh screen and no more than about 5% fines passing a 100 mesh screen. The addition of fines in prior art hot asphalt mixes weakens the composition because of the inability of the composition to absorb the fines between aggregate particles and because of the inability of such compositions to completely coat the fines.

A typical aggregate is a mixture of sand and gravel having the following properties:

| PHYSICAL PROPERTIES OF AGGREGATE Source of Aggregate - Rieth Riley - Francisville, Indiana | | |
| --- | --- | --- |
| Material | Sand | Gravel |
| Mechanical Analysis Sieve Size | parts by weight | parts by weight |
| ½" | 100 | 100 |
| ⅜" | 100 | 84.2 |
| #4 | 98.0 | 9.9 |
| #10 | 82.7 | 1.3 |
| #40 | 35.1 | .5 |
| #80 | 3.1 | .4 |
| #200 | .6 | .3 |
| | 419.5 | 296.6 |
| Specific Gravity | 2.61 | 2.65 |
| Absorption | 1.44% | 1.07% |
| Moisture Content Received | 4.0% | 2.1% |

The sulfonic acid source, added to the aggregate in addition to at least 1,000 gallons of water per 100 tons of aggregate, should be a sulfuric acid sludge, a spent sulfuric sludge, or a spent sulfuric acid. Some of these useful sulfonic acid sources are fully set forth in my U.S. Pat. No. 3,876,439 patented Apr. 8, 1975, which is hereby incorporated by reference. While all types of sulfuric acid sludges and spent sulfuric acid sludges can be utilized in the present invention, even those having as little acid as lubricating oil sludges, it is preferred to employ a sulfuric acid sludge or spent sulfuric acid sludge having 60-92% sulfuric acid. The sulfonic acid source may be mixed with the water in a tank prior to application. However, greater flexibility and control is possible when the acid is metered into the water line by a calibrated discharge pump. If the aggregate is already saturated when it is delivered from the stockpile it would be theoretically possible to spray the undiluted acid onto the aggregate on the feed belt and allow the mixing to occur in the drum, but better results would probably be obtained if the acid were blended with minimum amounts of water, such as 1 gallon acid to each ten gallons of water added.

In addition to at least 1,000 gallons of water per 100 tons of aggregate, an acid pH of 3.5 or less is a very important and necessary characteristic for the initial treatment of the aggregate. If the pH is neutral or basic, the aggregate will not be sufficiently coated or bonded when 10-40% less asphalt is used, and the resulting composition will not have the strength necessary for a road paving material.

The copious quantity of water (at least 1,000 gallons/100 tons aggregate) added to the aggregate in addition to the sulfonic acid source chemically interacts or reacts with the aggregate when a sulfonic acid source is present in an amount sufficient to lower the pH of the aggregate-acid-water composition to less than 3.5 and preferably at or below 2.0. If asphalt is added to the aggregate with the acid-water solution, the entire composition should have a pH less than 2.0. The sulfonic acid source is necessary for this interaction or reaction between the acid-water solution and the aggregate, as evidenced by improved coatability and strength.

It is this interaction or reaction between the acid-water solution and the aggregate particles which accounts for the better coatability of the aggregate particles with 10-40% less asphalt, and which accounts for firmer positioning and strength of the resulting asphaltic concrete on the soil structure. Substantial savings of asphalt (10-40%) can be achieved even when the aggregate is completely dried after treatment with the acid-water solution, indicating that the acid-water solution chemically changes the aggregate particles to more readily accept the asphalt when the aggregate is treated with a sulfonic acid source-water solution having water in an amount of at least 1,000 gallons per 100 tons of aggregate. As further evidence of the chemical reaction caused by the acid-water solution, when the above-described acid-water solution of the present invention is applied to the surface of highly oxidized asphaltic concrete which has become brittle and discolored grey with age, the interaction or reaction occurs with the old oxidized asphaltic concrete rendering it ductile and black.

The sulfonic acid source can be added to water prior to the addition of the acid-water solution to the hot mix plant, or the sulfonic acid source can be added separately in addition to water. To maintain the required amount of fluidity or liquidity of the composition of the present invention, water must be utilized in an amount of at least about 1,000 gallons per hundred tons of aggregate. Below this amount, complete coating of the aggregate will not occur when asphalt is used in the amount disclosed herein. The advantages of the present invention, and particularly the capability of saving 10-40% asphalt in a road paving material are only realized when water is used in an amount of at least 1,000 gallons per 100 tons of aggregate. A practical upper limit for the amount of water is about 3,000 gallons per hundred tons of aggregate since it would entail the removal of excessive amounts of moisture during the drying process and contribute to excessive energy consumption.

By employing these amounts of a sulfonic acid source and water in combination with the mixture of aggregate and asphalt in an asphalt hot mix plant, the strength of the asphaltic composition when used in the road construction will be comparable to compositions having 10% to 40% more asphalt.

The sulfonic acid source and the water can be added to the hot mix asphalt plant at a number of locations. The sulfonic acid source and the water can be added at the cold feed conveyor belt prior to entering the dryer, to the hot feed conveyor exiting the dryer, to the pugmill, or to the aggregate stockpile prior to the addition of the aggregate to the hot mix asphalt plant. However, it is difficult to achieve uniform addition of the sulfonic acid source when the stockpile is pretreated unless the sulfonic acid source is added to the aggregate at the conveyor belt during formation of the stockpile. It is therefore preferred to add the sulfonic acid source and the water either at the cold feed, hot feed, or at the pugmill. At the pugmill the acid solution may be applied to the aggregate just prior to the application of the hot asphalt, simultaneously with the application of the hot asphalt, or immediately following the application of the hot asphalt. A series of laboratory experiments were conducted that simulated the addition of the sulfonic acid source and water at each of these three locations and in varying concentrations. The results are shown in Tables I–II.

TABLE I
COLD FEED TREATMENT AT VARYING APPLICATION RATES OF SULFURIC ACID SOURCE

| SERIES NUMBER | SERIES DESCRIPTION | % ASPHALTIC CEMENT | SPECIFIC GRAVITY | % VOIDS | % VOIDS FILLED | UNIT WEIGHT (Lbs/Cu.Ft) | MARSHALL STABILITY (LB) | FLOW (MILI IN.) | APPROX. pH |
|---|---|---|---|---|---|---|---|---|---|
| I | Optimum Asphaltic | 3 | 2.31 | 6.8 | 49.8 | 144.4 | 1110 | 9 | 7 |
|  | Cement Content | 4 | 2.33 | 5.5 | 62.3 | 145.4 | 1220 | 10 | 7 |
|  | Determination - | 5 | 2.34 | 4.1 | 72.3 | 146.0 | 1400 | 14 | 7 |
|  | No Chemical | 6 | 2.37 | 1.5 | 90.0 | 147.9 | 1570 | 8 | 7 |
|  |  | 7 | 2.35 | 1.2 | 93.1 | 146.6 | 1140 | 11 | 7 |
| II | Cold Feed Treatment | 3 | 2.28 | 9.6 | 40.6 | 142.3 | 590 | 10 | 3.3 |
|  | .15 gal. sulfonic | 4 | 2.32 | 6.6 | 57.3 | 144.8 | 950 | 11 | 3.3 |
|  | acid source/500* | 5 | 2.35 | 3.7 | 75.3 | 146.6 | 1040 | 8 | 3.3 |
|  | gal. of H$_2$O/100 | 6 | 2.37 | 1.8 | 90.4 | 147.9 | 1020 | 8 | 3.3 |
|  | tons Aggregate |  |  |  |  |  |  |  |  |
| III | Cold Feed Treatment | 3 | 2.30 | 8.7 | 43.1 | 143.5 | 610 | 11 | 2.1 |
|  | .75 gal. sulfonic | 4 | 2.33 | 6.2 | 59.4 | 145.4 | 980 | 12 | 2.1 |
|  | acid source/500* | 5 | 2.36 | 3.4 | 76.8 | 147.4 | 1250 | 10 | 2.1 |
|  | gal. of H$_2$O/100 | 6 | 2.38 | 1.4 | 91.0 | 148.5 | 1230 | 10 | 2.1 |
|  | tons Aggregate |  |  |  |  |  |  |  |  |
| IV | Cold Feed Treatment | 3 | 2.34 | 6.2 | 50.1 | 146.0 | 1185 | 7 | 1.5 |
|  | 1.5 gal. sulfonic | 3.5 | 2.33 | 6.9 | 53.0 | 145.4 | 1390 | 8 | 1.5 |
|  | acid source/500* | 4 | 2.36 | 4.9 | 64.9 | 147.3 | 1655 | 8 | 1.5 |
|  | gal. of H$_2$O/100 | 4.5 | 2.36 | 4.1 | 71.3 | 147.3 | 1610 | 8 | 1.5 |
|  | tons Aggregate | 5 | 2.38 | 2.5 | 82.3 | 148.5 | 1285 | 7 | 1.5 |
|  |  | 6 | 2.39 | 1.3 | 93.1 | 149.1 | 955 | 10 | 1.5 |
| V | Cold Feed Treatment | 3 | 2.33 | 7.4 | 43.8 | 145.4 | 1375 | 5 | 1.4 |
|  | 2.25 gal. sulfonic | 3.5 | 2.32 | 7.3 | 51.6 | 144.7 | 1110 | 7 | 1.4 |
|  | acid source/500 gal.* | 4 | 2.36 | 4.8 | 65.6 | 147.3 | 1620 | 5 | 1.4 |
|  | of H$_2$O/100 tons | 4.5 | 2.37 | 3.6 | 74.3 | 147.9 | 1595 | 9 | 1.4 |
|  | Aggregate |  |  |  |  |  |  |  |  |
| VI | Cold Feed Treatment | 3 | 2.30 | 8.7 | 43.4 | 143.5 | 1845 | 9 | 1.0 |
|  | 3.0 gal. sulfonic | 4 | 2.38 | 4.1 | 69.1 | 148.5 | 2015 | 7 | 1.0 |
|  | acid source/500* | 5 | 2.39 | 2.0 | 85.1 | 149.1 | 1690 | 8 | 1.0 |
|  | gal. of H$_2$O/100 |  |  |  |  |  |  |  |  |
|  | tons Aggregate |  |  |  |  |  |  |  |  |

*Amount of water added to aggregate. Since aggregate already contained 2-½% to 3% entrained moisture, pH determinations are based upon approximate total moisture content of 5% or 1,000 gallons per one hundred tons of aggregate.

TABLE II
COLD FEED TREATMENT AT NORMAL AND REDUCED TEMPERATURES, FOR VARYING APPLICATION RATES OF WATER

| SERIES NUMBER | SERIES DESCRIPTION | % ASPHALTIC CEMENT | SPECIFIC GRAVITY | % VOIDS | % VOIDS FILLED | UNIT WEIGHT (Lbs/Cu.Ft) | MARSHALL STABILITY (LB) | FLOW (MILI IN.) | APPROX. pH |
|---|---|---|---|---|---|---|---|---|---|
| XVII | 1.5 gal. sulfonic |  |  |  |  |  |  |  |  |
|  | acid source/500* |  |  |  |  |  |  |  |  |
|  | gal. of H$_2$O |  |  |  |  |  |  |  |  |
|  | Dryer Temp. 250° | 3% | 2.29 | 9.0 | 42.5 | 142.9 | 675 | 5 | 1.2,1.5 |
|  | Mixture Temp. 225° | 4 | 2.32 | 6.5 | 57.8 | 144.8 | 757 | 8 | 1.2 |
| XVIII | 1.5 gal. sulfonic |  |  |  |  |  |  |  |  |
|  | acid source/1500* |  |  |  |  |  |  |  |  |
|  | gal. of H$_2$O |  |  |  |  |  |  |  |  |
|  | Dryer Temp. 250° | 3 | 2.31 | 8.3 | 44.7 | 144.1 | 713 | 12 | 1.85,2.1 |
|  | Mixture Temp. 225° | 4 | 2.32 | 6.3 | 58.5 | 144.8 | 861 | 6 | 1.85 |

TABLE II-continued
COLD FEED TREATMENT AT NORMAL AND REDUCED TEMPERATURES, FOR VARYING APPLICATION RATES OF WATER

| SERIES NUMBER | SERIES DESCRIPTION | % ASPHALTIC CEMENT | SPECIFIC GRAVITY | % VOIDS | % VOIDS FILLED | UNIT WEIGHT (Lbs/Cu.Ft) | MARSHALL STABILITY (LB) | FLOW (MILI IN.) | APPROX. pH |
|---|---|---|---|---|---|---|---|---|---|
| XIX | 1.5 gal. sulfonic acid source/3000* gal. of H2O | | | | | | | | |
| | Dryer Temp. 250° | 3 | 2.30 | 8.6 | 43.9 | 143.5 | 552 | 7 | 2.45,2.8 |
| | Mixture Temp. 225° | 4 | 2.37 | 4.5 | 67.2 | 147.9 | 1069 | 7 | 2.45 |
| XX | 1.5 gal. sulfonic acid source/500* gal. of H2O | | | | | | | | |
| | Dryer Temp. 350° | 3 | 2.34 | 6.2 | 50.1 | 146.0 | 1184 | 7 | 1.2,1.5 |
| | Mixture Temp. 325° | 4 | 2.34 | 5.6 | 61.8 | 146.0 | 1605 | 10 | 1.2 |
| XXI | 1.5 gal. sulfonic acid source/1500* gal. of H2O | | | | | | | | |
| | Dryer Temp. 350° | 3 | 2.31 | 8.4 | 44.2 | 144.1 | 1550 | 9 | 1.85,2.1 |
| | Mixture Temp. 325° | 4 | 2.34 | 5.7 | 61.6 | 146.0 | 2200 | 7 | 1.85 |
| XXII | 1.5 gal. sulfonic acid source/3000* gal. of H2O | | | | | | | | |
| | Dryer Temp. 350° | 3 | 2.36 | 6.6 | 50.9 | 147.3 | 1340 | 8 | 2.45,2.8 |
| | Mixture Temp. 325° | 4 | 2.34 | 5.8 | 61.1 | 146.0 | 1710 | 7 | 2.45 |

*See footnote, Table I

These experiments clearly demonstrate that the addition of a sulfonic acid source at the cold feed followed by the drying of the aggregate to a moisture content of less than 1% gives the best results. Table I shows the results that were achieved when the equivalent of 500 gallons of sulfonic acid solution of varying concentrations per 100 tons of aggregate were added to moisture already present, estimated to be approximately 500 gallons per 100 tons of aggregate. It clearly indicates that asphalt applied to the treated aggregate at the rate of 4% provides strength equal to the use of 6% to untreated aggregate and that the maintenance of a pH at or below 2.0 is necessary for optimum results. Table II demonstrates the need for thoroughly drying the aggregate before applying the asphalt. It also shows that the use of more than 3,000 gallons of water per one hundred tons of aggregate to be detrimental to the quality of the finished product. Furthermore, it indicates that the use of 2,000 gallons of water to be more effective than when only 1,000 gallons was employed. In reviewing these two charts, it should be borne in mind that the amounts of water shown are the quantities of solution added and that the total moisture content was 500 gallons more per ton than the figures shown before the aggregate was dried.

The application of the sulfonic acid solution to the heated aggregate before applying the asphalt, concurrently with the asphalt on the heated aggregate or subsequent to the application of the asphalt is not recommended except where hot asphalt emulsions are desired with asphaltic contents of less than 4%. In such cases the temperature of the dryer should be maintained at 225° F. or less and the pH should be less than 2.0 when mixing is begun and it should not be allowed to go above 3.5 until the mixing operation has been completed. It is preferred that the pH be below 3.5 at the time of laydown. However, this is difficult to achieve in calcareous materials.

Another important feature of the present invention is in the capability of utilizing and recycling worn asphalt road materials, such as asphalt concrete, instead of using new raw aggregate and asphalt. Worn asphalt paving materials can be broken up and treated in a hot mix plant just like the treatment of a mixture of aggregate and asphalt as described above. The sulfonic acid source and water can be added at any location described above with respect to the treatment of raw aggregate and asphalt. The acid-water solution causes the same above-described interaction or reaction with worn asphaltic concrete. When asphalt is reused in this manner, it is not necessary to add additional asphalt, oils, softening agents or rejuvenating agents such as would normally be required under standard procedures.

The burning or coking of reclaimed asphalt because of exposure to the direct flame in the drum makes the use of a standard drum dryer plant, a batch plant or a continuous mix plant infeasible in ordinary practice. The Mendenhall process, which utilizes heated tubes instead of direct exposure to flame as the means for transferring heat to the asphaltic composition, while an improvement over the standard plant, still requires the use of fluxing oils, petroleum-based softening agents and additional asphalt in order to achieve satisfactory homogeniety of the end product. Since another unusual property of a sulfonic acid-water solution is its ability to rejuvenate the surface of highly oxidized asphaltic concrete when applied to it after it has been heated or concurrently with heating it, its use in either a standard hot plant or one using the Mendenhall principle will not only obviate the need for additional asphalt, oils or softening agents, but will restore the old asphalt to full usefulness.

When a sulfonic acid-water solution is applied to the heated surface of asphalt that has become brittle and grey with oxidation and age, there is an almost instantaneous restoration of its ductility and black color. Since the loss of both ductility and the black color characteristic of high quality asphalt is due to the oxidation of the hydrogens that are covalently bound to the carbons that bond the structure of the asphalt molecule together, it can be concluded that the solution, as a result of the energy provided by the heat and the reduction-oxidation processes engendered thereby, yields a source of new hydrogen ions or atoms from the surplus present in the composition of the acid itself and from the dissociation of the water molecule into hydrogen and hydroxyl ions, and that these ions, by addition reactions, replenish the supply of those lost through the processes of oxidation and abrasion. However, regardless of any theory, it is a phenomenon readily observable, especially if the surface is heated to a very high temperature, such as 750° to 1,000° F. with a torch so as to burn or "coke" the asphalt and then is quickly drenched with a dilute sulfonic acid solution.

Because of this unique property, the application of a dilute sulfonic acid solution to the surface of asphaltic paving that has been heated and from which the oxidized surface has been removed by a heater-planer, a Cutler machine or a Galion RP-30 Road Planer supplemented by independent heating sources or to incorporate it into an asphaltic composition that has been planed, bladed, scarified, removed by rotary cutting or planing bits or disced from the compacted paving after heating will eliminate the need for adding additional asphalt, fluxing oils or softening agents, as must be done when traditional methods are followed. When relaid and rolled, the resulting composition will be equal or superior to that obtained by utilizing standard procedures.

One of the unique advantages that the use of sulfonic acid-water solutions affords in contrast to the application of additional asphalt, fluxing oils and softening agents is the ease of application it offers. It may be applied with any water truck, portable spray rig or asphalt distributor. Since virturally all steel wheeled rollers used for the compaction and finishing of the surface of the paving are equipped with water tanks and the means for wetting the roller and the surface of the asphalt, it is only necessary to substitute the sulfonic acid solution for the water and the rejuvenation of the asphalt can be done concurrently with the rolling at no extra cost. Additionally, this unusual feature will make possible further savings wherever heavy steel wheeled or vibratory rollers are available. By preheating the asphaltic paving by means of radiant heat or direct flame to temperatures of 300° to 500° F., then immediately rolling it, preferably with a vibratory roller and applying concurrently the dilute sulfonic acid solution and repeating the process one or more times, if necessary, the wearing surface may be both levelled and made ductile enough on many roads and streets to be suitable for use for as long and perhaps longer than newly applied asphaltic concrete from a hot plant without the need for blading, planing or discing as is necessary when using standard methods and procedures.

It is also possible to utilize hand operated vibratory equipment or tools capable of delivering rapid, repetitive blows of high impact through shoes and plates of various sizes while repairing badly cracked or alligatored sections which may be optionally mounted on motive equipment, thus eliminating the need for excavating and rebuilding areas of extreme distress. By preheating with radiant sources or direct flame, applying light applications of the sulfonic acid-water solution onto the area being reworked just prior to, concurrently with and/or immediately following the use of such equipment, repeated as many times as necessary, any asphaltic paving, regardless of the extent of the fracturing or oxidation of the structure, may be rejuvenated.

Another novel use of a sulfonic acid-water solution and heat is the complete reclamation of recycling of all of the asphaltic surfacing present on any road regardless of thickness instead of only rejuvenating or resurfacing to a fraction of the depth to which it is found. Frequently there is far more asphalt present than is required for the maintenance of a suitable wearing surface that will support the traffic to which it is subjected. By utilizing standard road graders, scarifiers, rippers, pulvamixers, water trucks, heating equipment and rollers, it is possible to make full reuse of all asphalt present. Often more can be reclaimed than is needed for surfacing. The surplus may either be hauled away to another job site or it may be incorporated into the base as additional stabilizing material. The ability to restructure and restore the integrity of the entire surface or to utilize any excess material that may be present through repeated additions or reapplications of asphalt to the wearing surface as highly effective base material in situ without the need for hauling it away to a hot plant many miles away constitutes another important breakthrough in the art of roadbuilding and asphalt technology.

Another important potential exists for the combined use of dilute sulfonic acid-water solutions and properly applied heat. Paving asphalts may be applied in the field directly to materials already available there or that may have been imported from other sources. When incorporated into the aggregate, rock, sand, soil or mixtures thereof it is possible to produce either suitable asphalt stabilized base compositions containing from 1.5% to 4% asphalt or, with properly selected aggregates, satisfactory paving compositions containing from 3.5% to 5% asphalt, either of which will be comparable to standard compositions containing from 10% to 40% more asphalt.

When recycling existing asphaltic paving in situ, it is necessary to scarify, rip and crush the large chunks to sizes suitable for handling or manipulating with grader blades, discs, pulvamixers and supplemental heating equipment. It is necessary to utilize enough heat so that water usage is not so excessive as to unnecessarily dilute the resulting emulsion or dispersion that results and to lose it into the underlying base and subbase structure. During hot summer weather, the amount of heat required is correspondingly small, while in fall and spring it can be quite high, but still much less than the amount required for transporting the same quantity of material to a hot plant, for heating it to the much higher temperatures required under standard procedures and then hauling it back again to the original job site or to another one located elsewhere.

When dispersing freshly applied asphaltic concrete, the use of water heated to temperatures above 140° F. and preferably to approximately 200° F. or the application of steam into which the sulfonic acid source is injected prior to or concurrently with its application will prove to be the most economical and practical method. In summer time, the amount of water needed will be approximately equal to, or slightly in excess of the amount of asphalt used. When average ambient temperatures are below 50° F., more hot water or steam will be needed or, preferably, supplemented by the application of heat from either radiant sources or, if necessary, by direct flame. If a direct flame is used, it should be preferably directed at the composition while it is being agitated as would be the case if one or more high capacity burners were installed in the hood of a pulvamixer with the flame directed at the points of greatest agitation of the composition. Alternately, the installation of hot water or steam jets would serve the same purpose, but with more severe limitations as to the range of climatic conditions under which the machine could be operated. Under either method, the asphalt could be simultaneously applied through the metering pumps and spray nozzles with which such equipment can be usually equipped.

It is in conjunction with the recycling of old, weathered and oxidized asphalt surfacing that the most intensive use of heat is necessary. However, as the smaller chucks or pieces begin to disintegrate as a result of the unique solvent action of the sulfonic acid-water solution already described herein, the mechanical forces of abrasion and crushing of the equipment and heat can be judiciously applied to the larger bits and pieces that are more resistant to homogenization, a reclaimed composition suitable for use as either surfacing or valuable stabilized base material is soon available for use at the job site and not in some plant many miles away. It is the ability to selectively direct both the greatest amount of heat and mechanical effort toward the most resistant portion of the asphaltic composition found in situ while maintaining a pH of 3.5 or less and preferably between 1.0 and 2.0 upon the surface of the composition that makes this method so economical in comparison with any other in practice anywhere. It is impossible to closely prescribe the amount of heat to be used or the exact temperatures to be maintained because of the great variations in ambient climatic and soil temperatures, the variability of the various types of asphalts and aggregates that have been used or applied through the years and the weight and volume of the traffic carried. However, because of the ability of the sulfonic acid-water solution to convert any asphaltic composition into an inverted emulsion or dispersion state with only a nominal increase of temperature above normal summertime ambients that normally prevail, a sufficient amount of mechanical abrasion and crushing by wheels, blades, rollers and the tracks of crawler types of tractors and supplemented during the later stages of the breakdown and dispersion of the composition by a pulvamixer, if available, the judicious application of heat in order to reduce the amount of water that would otherwise be used is all that is required in order to reduce the excessive liquidity that would otherwise be present. This, in itself, represents another novel, important feature of this invention.

The various methods of rejuvenating the surface of existing asphaltic paving, of restoring the ductility and life of asphalt so that it may be reused in situ as either newly reconstituted paving or in part as valuable base stabilization as described above, without the use of additional asphalt, any known solvents, oils, softening or emulsifying agents, antiwetting agents or any existing organic or mineral acids, are possible only through the use of properly selected sulfonic acid sources and water at the dilution rates previously described and applied within the pH ranges outlined, supplemented by the various methods of applying heat as detailed. It is the only method or process that will achieve such results while making it possible to reduce the amount of asphalt present in the final composition by 10% to 40% without deleteriously affecting the quality or the life expectancy of the resulting paving or stabilized base into which it may be incorporated. There is no other method wherein it is at times advisable instead of additional asphalt, oils or softening agents, to add more aggregate, sand or finely divided material because of the superior coating characteristics imparted to asphalt by the proper application of dilute sulfonic acids solutions and heat as I have described herein.

FIELD STUDY

Asphaltic concrete compositions were prepared in a batch hot mix asphalt plant in accordance with the present invention and laid and rolled onto an existing street in the city of Miami Beach for comparison with a street surface coated with a composition not employing the sulfonic acid source-water solution utilized in accordance with the present invention. The physical properties of the aggregate utilized in this field study were first determined as set forth in the following table:

| PHYSICAL PROPERTIES OF FIELD STUDY AGGREGATE | | |
|---|---|---|
| Source of Aggregate - Brewer Cote Aspahalt Company - Medley, Florida | | |
| Material | Sand | Gravel |
| Mechanical Analysis Sieve Size | parts by wt. | parts by wt. |
| ½ | 0 | 0 |
| ⅜ | 0 | 2.0 |
| #4 | .7 | 67.6 |
| #10 | 7.7 | 29.2 |
| #40 | 30.2 | 0.4 |
| #80 | 40.8 | 0.1 |
| #200 | 18.6 | 0.5 |
| −200 | 2.0 | 0.2 |
| | 100.0 | 100.0 |
| Specific Gravity | 2.58 | 2.34 |
| Moisture Content Received | | |

The aggregate used in the field study was a mixture of 40% by weight sand and 60% by weight gravel.

Various compositions were prepared and laboratory tested prior to being layed-down on location and found to have the properties shown in Table II.

TABLE III

LABORATORY ASPHALTIC CONCRETE DESIGN
BREWER COTE PLANT, MEDLEY, FLORIDA

| SERIES NUMBER | SERIES DESCRIPTION | % ASPHALTIC CEMENT | SPECIFIC GRAVITY | % VOIDS | % VOIDS FILLED | UNIT WEIGHT (Lbs./Cu.Ft) | MARSHALL STABILITY (LB) | FLOW (MILI IN.) | APPROX. pH |
|---|---|---|---|---|---|---|---|---|---|
| 1 | LABORATORY | 5 | 2.06 | 9.3 | 52.0 | 128.5 | 1665 | 19 | 7 |
| | Optimum Asphaltic | 6 | 2.08 | 7.2 | 62.8 | 129.8 | 1610 | 14 | 7 |
| | Cement Determina- | 7 | 2.11 | 5.2 | 75.1 | 131.7 | 1785 | 11 | 7 |
| | tion - No Chemical | 7.5 | 2.12 | 3.8 | 80.6 | 132.3 | 2345 | 12 | 7 |
| | | 8 | 2.14 | 2.5 | 87.1 | 133.5 | 2250 | 11 | 7 |
| II | LABORATORY | 4 | 2.03 | 12.0 | 40.1 | 126.7 | 1565 | 13 | 1.5 |
| | Cold Feed Treatment | 5 | 2.04 | 10.2 | 49.7 | 127.3 | 1665 | 17 | 1.5 |
| | of Aggregate with | 5.5 | 2.06 | 8.7 | 59.1 | 128.5 | 2195 | 12 | 1.5 |
| | sulfonic acid source | 6 | 2.08 | 6.8 | 64.4 | 129.8 | 1795 | 13 | 1.5 |

TABLE III-continued

LABORATORY ASPHALTIC CONCRETE DESIGN
BREWER COTE PLANT, MEDLEY, FLORIDA

| SERIES NUMBER | SERIES DESCRIPTION | % ASPHALTIC CEMENT | SPECIFIC GRAVITY | % VOIDS | % VOIDS FILLED | UNIT WEIGHT (Lbs./Cu.Ft) | MARSHALL STABILITY (LB) | FLOW (MILI IN.) | APPROX. pH |
|---|---|---|---|---|---|---|---|---|---|
| | 1.5 gal./500 gal.*H₂O/ 100 tons Aggregate | 6.5 | 2.08 | 6.8 | 66.0 | 129.8 | 1720 | 13 | 1.5 |
| | | 7 | 2.10 | 5.6 | 72.1 | 131.0 | 1635 | 13 | 1.5 |
| III | LABORATORY Cold Feed Treatment of Aggregate with sulfonic acid source | 4 | 2.01 | 12.5 | 38.8 | 125.4 | 1290 | 15 | 2.1 |
| | | 5 | 2.06 | 9.2 | 52.4 | 128.5 | 1730 | 13 | 2.1 |
| | | 6 | 2.06 | 8.0 | 60.2 | 128.5 | 1610 | 14 | 2.1 |
| | 1.5 gal./1500 gal. H₂O/100 tons Aggregate | 7 | 2.09 | 6.0 | 70.5 | 130.4 | 1635 | 14 | 2.1 |
| IV | Field Mixtures from Brewer Cote Asphalt Plant in Midley, Fla. | | | | | | | | |
| IV | A. Optimum Mixture - No Chemical | 7.5 | 2.18 | 1.0 | 94.0 | 135.9 | 2745 | 14 | |
| | B. Cold Feed Treatment | 5.5 | 2.13 | 6.0 | 66.7 | 132.6 | 2645 | 14 | |

In Table III, Series I consists of untreated asphaltic concrete. Series II and III were prepared with the addition of the sulfonic acid source at the rate of 1.5 gallons per hundred tons of aggregate. The difference between Series II and III is due to the difference in amount of water added to the sulfonic acid source.

As seen from Table III, the sulfonic acid treated mixture has a slightly lower Marshall Stability. However, if proper adjustments are made for voids by the addition of fines so that the voids in the total mixture are about 3%, higher Marshall Stabilities will result.

A Cedar Rapids batch plant was used in the preparation of the compositions laid-down at the city of Miami Beach. Two batches were prepared - one employing sulfonic acid source and one without. Three gallons of a sulfonic acid source were mixed with 750 gallons of water and the diluted sulfonic acid source fed to the aggregate on the cold feed conveyor belt. A pump having a calibrated discharge was used to add the diluted sulfonic acid source at a rate of 1.44 gallons per 100 tons of aggregate. Additional water was added through a spray bar giving an effective concretration of 1.5 gallons of sulfonic acid source per 500 gallons of water. The treated aggregate was dried and introduced to the pug mill at a temperature of about 275° F. where it was mixed with the asphaltic cement. The treated mixture having 5.5% asphalt by weight was discharged directly into trucks and transported to the laid-down location.

The second (prior art) mix was prepared the same as the first with the omission of the solution of sulfonic acid source. The pugmill temperature for this second batch was raised to about 325° F., and the composition had an asphalt content of 7.6%. Both compositions were laid-down side by side on a street in the city of Miami Beach. The treated first composition had a paving temperature of about 240°-250° F. at lay-down, whereas the second (prior art) composition had a paving temperature at lay-down of about 275°-285° F.

From the results, it was determined that a reduction in asphaltic cement of from 7.6% for the untreated composition to 5.5% for the reaction product treated asphalt concrete (a reduction of about 27.6% asphalt) will result in comparable Marshall Stabilities. The treated mixture retained its heat longer than the nontreated mixture and was effectively rolled at lower temperatures. The treated asphaltic concrete was easier to level and the dump trucks appeared to discharge the treated asphaltic concrete with less agglomeration. Further, the hand equipment was easier to clean for the treated composition.

The lower asphalt content of the asphaltic concrete produced in accordance with the process of the present invention makes possible a degree of control not previously achieved in the operation of asphalt hot mix plants. Further, by utilizing the sulfonic acid source in hot mix asphalt plants, a more porous surface can result from identical gradations of aggregate, or increased Marshall Stability readings can be achieved by the addition of finely divided materials or mineral fillers. Intermediate results may be obtained by utilizing either fines, such as those passing a 100 mesh screen, or by utilizing a gradation of larger aggregate particles which grade from a maximum size passing a number 8 screen to a minimum size passing a number 50 screen. The larger particles will yield slightly lower Marshall Stability readings but more porosity.

Although the present invention has been described with reference to several illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A treated aggregate composition comprising an aggregate of stone and finely divided particles; water in an amount of at least 1000 gallons per 100 tons of aggregate and a sulfonic acid source selected from the group consisting of sulfuric acid sludge, spent sulfuric sludge, and spent sulfuric acid in an amount such that the pH of the composition is less than 3.5.

2. A composition as defined by claim 1 wherein the amount of the sulfonic acid source is in the range of 0.5-8 gallons per 100 tons of aggregate.

3. A composition as defined by claim 1 wherein the amount of water is less than 3,000 gallons per 100 tons of aggregate.

4. An aggregate composition as defined by claim 1 wherein the aggregate comprises 40–60% stone, and 40–60% finely divided particles.

5. An aggregate composition as defined by claim 1 wherein the sulfonic acid source contains at least 60% sulfuric acid.

6. A method of treating aggregate comprising contacting said aggregate with water in an amount of at least 1,000 gallons of water per 100 tons of aggregate, combining a sulfonic acid source selected from the group consisting of sulfuric acid sludge, spent sulfuric sludge, and spent sulfuric acid with said water to form a mixture of aggregate, water, and sulfonic acid source, said mixture having a pH of less than 3.5.

7. A method as defined in claim 6 wherein said sulfonic acid source is combined in an amount of at least 0.5 gallon per 100 tons of aggregate.

8. A method as defined in claim 7 wherein said sulfonic acid source is combined in an amount less than 8 gallons per 100 tons of aggregate.

9. A method as defined in claim 6 wherein said sulfonic acid source is combined in an amount of at least 1 gallon per 100 tons of aggregate.

10. A method as defined in claim 9 wherein said sulfonic acid source is combined in an amount less than 8 gallons per 100 tons of aggregate.

11. A method of coating aggregate with asphalt to form an asphaltic concrete composition comprising
    contacting an aggregate of stone and finely divided particles with water in an amount of at least 1,000 gallons of water per 100 tons of aggregate,
    combining a sulfonic acid source selected from the group consisting of sulfuric acid sludge, spent sulfuric sludge, and spent sulfuric acid with said water to form a mixture of aggregate in an acid-water solution, said mixture having a pH less than 3.5, and
    combining asphalt with said aggregate in an amount sufficient to substantially completely coat said aggregate.

12. A method as defined in claim 11 further including removing a majority of said acid-water solution before combining asphalt with said aggregate.

13. A method as defined in claim 12 wherein at least 95% of said acid-water solution is removed prior to contacting said aggregate with asphalt.

14. A method as defined in claim 13 wherein said aggregate is substantially completely dried prior to contacting said aggregate with asphalt.

15. A method of preparing an asphaltic composition comprising admixing a sulfonic acid source selected from the group consisting of sulfuric acid sludge, spent sulfuric sludge, and spent sulfuric acid, aggregate, and water in an amount of at least 1,000 gallons of water per 100 tons of aggregate, heating the composition to at least 210° F., coating the composition with hot asphalt, and compacting said composition.

16. A method as defined by claim 15 including adding said sulfonic acid source to said aggregate and thereafter adding the asphalt.

17. A method as defined by claim 16 wherein the sulfonic acid source is added after heating the aggregate to 150°–350° F.

18. A method as defined by claim 15 wherein the sulfonic acid source is added in an amount of at least 0.5 gallon per 100 tons of aggregate.

19. A method as defined by claim 15 wherein the sulfonic acid source is added in an amount of at least 1.0 gallon per 100 tons of aggregate.

20. A method as defined by claim 15 wherein the sulfonic acid source is added in an amount sufficient to adjust the pH of the asphaltic composition to less than 3.5.

21. A method as defined by claim 15 wherein the sulfonic acid source is added in an amount sufficient to adjust the pH of the asphaltic composition to less than 2.

22. A method as defined by claim 15 wherein the sulfonic acid source is added in an amount sufficient to adjust the pH of the asphaltic composition to between 1 and 2.

23. A method of making a hot asphaltic composition comprising admixing a sulfonic acid source selected from the group consisting of sulfuric acid sludge, spent sulfuric sludge, and spent sulfuric acid, an aggregate of stone and finely divided material, and water in an amount of at least 1,000 gallons per ton of aggregate to form a treated aggregate having a pH of less then 3.5, heating the aggregate to 150°–350° F., adding asphalt to the aggregate in an amount of about 0.5–6% based on the combined weight of aggregate and asphalt to form a hot asphalt composition.

24. A method as defined by claim 23 wherein the sulfonic acid source is added in an amount such that the pH of the asphaltic composition is less than 2.

25. A method as defined by claim 23 wherein the sulfonic acid source is added in an amount such that the pH of the asphaltic composition is between 1 and 2.

26. A method as defined by claim 23 wherein the water is added in an amount of 1,000 to 3,000 gallons per 100 tons of aggregate.

27. Method of rejuvenating worn asphaltic paving which comprises preheating said paving to a temperature from about 300° F. to about 500° F., rolling said preheated paving with a wheeled roller while applying concurrently an aqueous sulfonic acid solution selected from the group consisting of sulfuric acid sludge, spent sulfuric sludge, and spent sulfuric acid in an amount such that the pH of the paving surface composition is 3.5 or less.

28. Method of claim 27 wherein the surface of the paving is maintained at a pH of from 1 to 2.

29. Method of recycling existing asphaltic paving in situ which comprises breaking the paving into pieces of a size suitable for spreading and leveling with a grader blade, admixing said pieces with an aqueous sulfonic acid solution, said sulfonic acid selected from the group consisting of sulfuric acid sludge, spent sulfuric sludge, and spent sulfuric acid at a temperature of at least 140° F. to achieve a composition having a pH of 3.5 or less, and spreading and rolling said composition of a temperature of 200°–250° F. to form an asphaltic paving.

30. Method of claim 29 wherein the sulfonic acid solution is at a temperature of at least 200° F.

* * * * *